(12) United States Patent
LeBlanc et al.

(10) Patent No.: US 7,912,940 B2
(45) Date of Patent: Mar. 22, 2011

(54) NETWORK SYSTEM ROLE DETERMINATION

(75) Inventors: David LeBlanc, Monroe, WA (US); Pierre-Yves Santerre, Bellevue, WA (US); Ramsey Dow, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1136 days.

(21) Appl. No.: 10/903,875

(22) Filed: Jul. 30, 2004

(65) Prior Publication Data

US 2006/0069805 A1 Mar. 30, 2006

(51) Int. Cl.
G06F 15/16 (2006.01)
G06F 15/173 (2006.01)

(52) U.S. Cl. ........ 709/224; 709/223; 709/226; 709/228; 709/237

(58) Field of Classification Search .................. 709/223, 709/224, 226, 228, 237; 713/151
See application file for complete search history.

(56) References Cited

U.S. PATENT DOCUMENTS

| | | | |
|---|---|---|---|
| 6,112,243 A | 8/2000 | Downs et al. | |
| 6,438,592 B1* | 8/2002 | Killian | 709/224 |
| 6,754,816 B1 | 6/2004 | Layton et al. | |
| 6,779,016 B1 | 8/2004 | Aziz et al. | |
| 6,782,408 B1 | 8/2004 | Chandra et al. | |
| 6,836,750 B2 | 12/2004 | Wong et al. | |
| 6,880,002 B2 | 4/2005 | Hirschfeld et al. | |
| 6,895,534 B2 | 5/2005 | Wong et al. | |
| 6,922,791 B2 | 7/2005 | Mashayekhi et al. | |
| 6,963,981 B1 | 11/2005 | Bailey et al. | |
| 6,990,666 B2 | 1/2006 | Hirschfeld et al. | |
| 7,013,462 B2 | 3/2006 | Zara et al. | |
| 7,058,826 B2 | 6/2006 | Fung | |
| 7,058,858 B2 | 6/2006 | Wong et al. | |
| 7,073,198 B1* | 7/2006 | Flowers et al. | 713/151 |
| 7,076,633 B2 | 7/2006 | Tormasov et al. | |
| 7,082,464 B2 | 7/2006 | Hasan et al. | |
| 7,093,005 B2 | 8/2006 | Patterson | |
| 7,124,289 B1 | 10/2006 | Suorsa | |
| 7,127,625 B2 | 10/2006 | Farkas et al. | |
| 7,131,123 B2 | 10/2006 | Suorsa et al. | |
| 7,134,011 B2 | 11/2006 | Fung | |
| 7,139,930 B2 | 11/2006 | Mashayekhi et al. | |

(Continued)

FOREIGN PATENT DOCUMENTS

EP    1 385 295 A1    1/2004

OTHER PUBLICATIONS

Arkin, "ICMP Usage in Scanning—The Complete Know How," http://www.sys-security.com/html/projects/icmp.html, version 3, Jun. 2001, pp. 1-218.

(Continued)

Primary Examiner — Quang N. Nguyen

(57) ABSTRACT

The role of a system in a network may be categorized as a networking system, a security system, a systems management system, a mail system, a database system, a web system, a file/print system, a communication and collaboration system, and/or any other system in the network. The role of a target system may be determined by sending test probes to one or more systems in a target network. The test probes may be data packets crafted to produce a particular response from a target system. The received responses may be compared to signature responses of a basis system with known operating system, services, and/or roles. By matching the received responses with signature responses, a role resolver may associate a role with the target system.

20 Claims, 7 Drawing Sheets

U.S. PATENT DOCUMENTS

| | | |
|---|---|---|
| 7,143,420 B2 | 11/2006 | Radhakrishnan |
| 7,146,353 B2 | 12/2006 | Garg et al. |
| 7,152,109 B2 | 12/2006 | Suorsa et al. |
| 7,152,157 B2 | 12/2006 | Murphy et al. |
| 7,194,439 B2 | 3/2007 | Kassan et al. |
| 7,194,616 B2 | 3/2007 | Axnix et al. |
| 7,225,441 B2 | 5/2007 | Kozuch et al. |
| 7,231,410 B1 | 6/2007 | Walsh et al. |
| 7,257,584 B2 | 8/2007 | Hirschfeld et al. |
| 7,278,273 B1 | 10/2007 | Whitted et al. |
| 7,281,154 B2 | 10/2007 | Mashayekhi et al. |
| 7,302,608 B1 | 11/2007 | Acharya et al. |
| 7,313,573 B2 | 12/2007 | Leung et al. |
| 7,333,000 B2 | 2/2008 | Vassallo |
| 7,349,891 B2 | 3/2008 | Charron et al. |
| 7,350,068 B2 | 3/2008 | Anderson et al. |
| 7,350,186 B2 | 3/2008 | Coleman et al. |
| 7,496,662 B1 * | 2/2009 | Roesch et al. ............... 709/224 |
| 2002/0069369 A1 | 6/2002 | Tremain |
| 2004/0046785 A1 | 3/2004 | Keller |
| 2004/0226010 A1 | 11/2004 | Suorsa |
| 2005/0097199 A1 * | 5/2005 | Woodard et al. ............. 709/223 |

OTHER PUBLICATIONS

Arkin et al., "The Present and Future of Xprobe2," http://www.sys-security.com/archive/papers/Present_and_Future_Xprobe2-v1.0.pdf, Jul. 31, 2003, pp. 1-35.

Fyodor "Remote OS Detection via TCP/IP Stack Fingerprinting," http://wwwinsecure.org/nmap/nmap-fingerprinting-article.html, Jun. 11, 2002.

Mateti, "Port Scanning," http:/www.cs.wright.edu/~pmateti/Courses/499/Probing, College of Engineering and CS, Wright State University, Jun. 29, 2001.

* cited by examiner

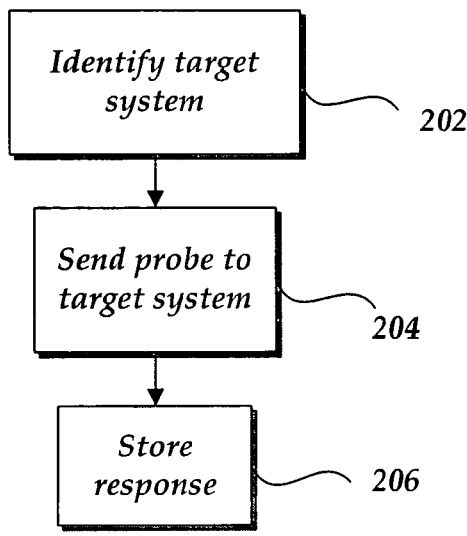
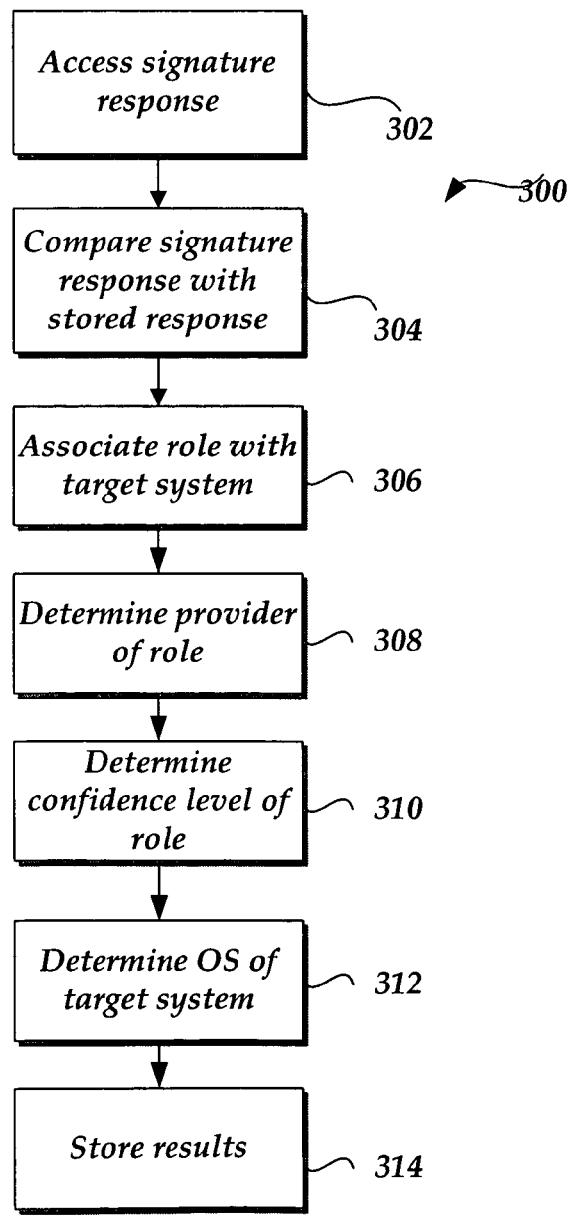
*Figure 2*
*Figure 3*

.
.
.

[[File/Print System ⬉ 402

[HP Printer ⬉ 410
HttpVersion=\*Hewlett Packard ⬉ 404           ⎫ 406
IcmpFingerprint=OK\s1100:000:0:0:0:0 64/0 ⬉ 404 ⎭

[HP Printer ⬉ 410
IcmpFingerprint=OK\s1100:000:0:0:0:0 64/0 ⬉ 404 ⎫ 406
TelnetVersion2=\*HP JetDirect ⬉ 404          ⎭

[HP Printer ⬉ 410
IcmpFingerprint=OK\s1100:000:0:0:0:0 64/0

[Xerox Printer ⬉ 410
HttpVersion=\*Xerox_MicroServer
IcmpFingerprint=OK\s1110:000:0:0:0:0 255/0

[Lexmark File/Print Server ⬉ 410
ActivePort=21
FtpVersion=\*Lexmark

[FTP Server ⬉ 410
ActivePort=21
FtpVersion=\*OK

[HP JetDirect Printer Server ⬉ 410
ActivePort=9100

[[Email Server ⬉ 402

[Pop3 Mail Server ⬉ 410
ActivePort=110
PopVersion=\*OK

[SMTP Mail Server ⬉ 410
ActivePort=25
SmtpVersion=\*

[IMAP Mail Server ⬉ 410
ActivePort=143

[[Collaboration and   ↖ 402
Communication Server

[Default Collaboration and ↖ 410
Communication Server (DNS
Server)
ActivePort=53

[[Database Server ↖ 402

[DB2 Database Server ↖ 410
ActivePort=50000
Db2Check=FOUND

[Microsoft SQL Server ↖ 410
ActivePort=1433
SqlCheck=FOUND

[Microsoft SQL Server ↖ 410
ActivePort=2433
SqlCheck=FOUND

[MySQL Database Server ↖ 410
ActivePort=3306
MySqlCheck=FOUND

[Oracle Database Server ↖ 410
ActivePort=1521
OracleCheck=FOUND

[PostgreSQL Database Server ↖ 410
ActivePort=5432
PostgreSqlCheck=FOUND

[Sybase Database Server ↖ 410
ActivePort=5000
SybaseEaCheck=FOUND

[Sybase Database Server ↖ 410
ActivePort=5001
SybaseEaCheck=FOUND

[Sybase Database Server 
ActivePort=5002
SybaseEaCheck=FOUND

[Sybase Database Server 
ActivePort=5003
SybaseEaCheck=FOUND

[Sybase Database Server 
ActivePort=5004
SybaseEaCheck=FOUND

[Sybase Database Server 
ActivePort=4100
SybaseEaCheck=FOUND

[[Web Server 

[Apache Web Server 
HttpVersion=\*Apache

[Tomcat Web Server 
HttpVersion=\*Tomcat

[Microsoft IIS Web Server
HttpVersion=\*Microsoft-IIS

[Generic Web Server 
ActivePort=80
HttpVersion=\*OK

[[SSH Server 

[SSH Server
ActivePort=22
SshVersion=\*OK

[[Telnet Server

[Telnet Server 
ActivePort=23
TelnetVersion=\*

NETWORK SYSTEM ROLE DETERMINATION

FIELD OF THE INVENTION

This application is directed to computer systems management, and more particularly, to computer systems management by detecting the role of a system in a network.

BACKGROUND OF THE INVENTION

Systems administrators may have difficulty identifying assets that are attached to a particular network and identifying what software those assets are supporting, particularly if the network is large and decentralized. Typically, systems administrators attempt to maintain databases indicating the information related to each system, e.g., identity, location, software version, and the like. Systems administrators use the information in the database to determine which upgrades are required, what potential security holes may exist in the network, and ensure proper compatibility between different computer system assets.

SUMMARY OF THE INVENTION

The following presents a simplified summary of the disclosure in order to provide a basic understanding to the reader. This summary is not an exhaustive or limiting overview of the disclosure. The summary is not provided to identify key and, or critical elements of the invention, delineate the scope of the invention, or limit the scope of the invention in any way. Its sole purpose is to present some of the concepts disclosed in a simplified form, as an introduction to the more detailed description that is presented later.

Maintaining a database of computer system assets and supported software can be difficult in the dynamic environment of computer systems management. Different entities maybe responsible for updating different computer systems, the number and variety of systems to be maintained may be large, and/or systems administrators may not update the database whenever an asset is modified such as updating of the operating system, changing the role of a server, and the like.

To assess the security and vulnerability of networked systems, some systems administrators have developed computer system fingerprinting techniques to remotely determine the operating system. Fingerprinting techniques, including Transmission Control Protocol (TCP) stack-based fingerprinting and Internet Control Message Protocol (ICMP) fingerprinting, however, only return the operating system and potentially the version supported by a computer system. The systems administrator must then review the operating system determination along with their knowledge of the network structure, and use heuristics to estimate the role fulfilled by the system in the networked environment.

The role of a system in a network may be categorized as a networking system, a security system, a systems management system, a mail system, a database system, a web system, a file/print system, a communication and collaboration system, and/or any other system in the network. The role of a target system may be determined by sending test probes to one or more systems in a target network. The test probes may be data packets crafted to produce a particular response from a target system. The received responses may be compared to signature responses of a basis system with known operating system, services, and/or roles. By matching the received responses with signature responses, a role resolver may associate a role with the target system.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 is flow chart of an example method of probing a target system in one embodiment;

FIG. 3 is a flow chart of an example method of determining a role of a target system in one embodiment;

FIGS. 4, 5, 6, and 7 are an example signature data file in one embodiment;

DETAILED DESCRIPTION

Figure 1:
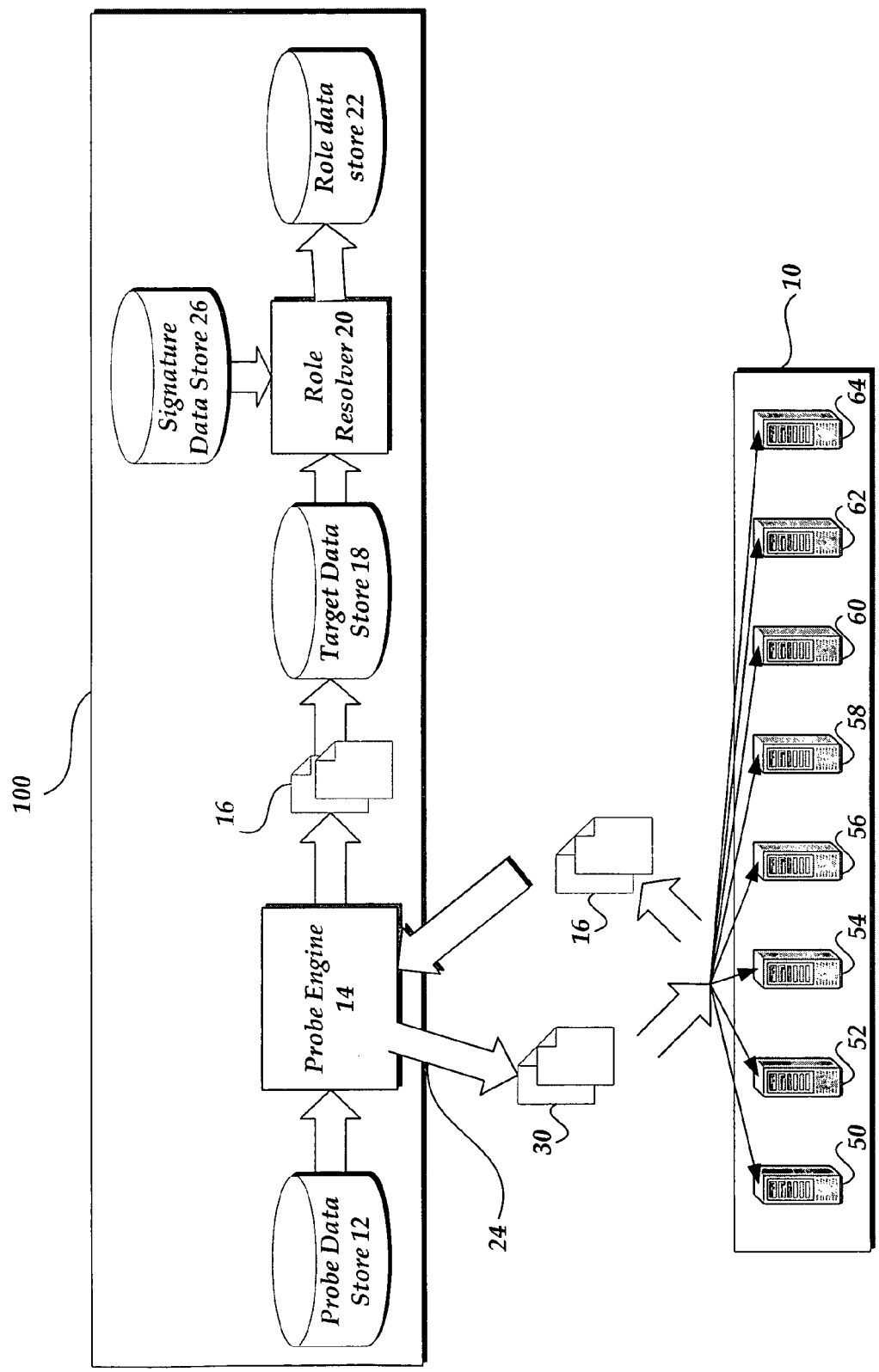
FIG. 1 is a functional diagram of a computer system management system in accordance with an embodiment.

FIG. 1 illustrates an example computer systems network 10 which may be tracked and/or supported by a management system 100. The systems comprising the target network 10 may include any combination and number of a variety of systems including a desktop station running any operating system, a router, a server, and/or any other networked system. As shown in FIG. 1, the target network 10 may include a networking system 50, a security system 52, a systems management system 54, a mail system 56, a database system 58, a web system 60, a file/print system 62, a communication and collaboration system 64, and/or any other system which may be a part of a network. Although FIG. 1 illustrates each system within network 10 as a separate system, it is to be appreciated that a single computer system may provide any number of the systems illustrated in FIG. 1, and/or each system illustrated in FIG. 1 may be provided by multiple computer systems.

Each of the systems 50, 52, 54, 56, 58, 60, 62, 64, as part of the network 10, may be defined or categorized by their roles within the network. Although these roles may overlap in some cases, those of skill in the art will recognize that these and any other defined roles may be appropriate. For example, the networking system 50 may be any network infrastructure component including a router, a switch, a gateway, a network server, and the like. The security system 52 may be a server or any other system hosting and/or supporting security for at least a portion of the network 10, such as a firewall, virtual private network, proxy server, secure shell (SSH) server, and the like hosted by any computer system such as the Microsoft Internet Security and Acceleration Server 2004™ available from Microsoft Corporation of Redmond, Wash. The systems management system 54 may be a server or any other system tracking and/or supporting centralized network management such as a backup server, software distribution server, and the like. The systems management system 54 may be hosted, for example, on a Microsoft® Systems Management Server available from Microsoft Corporation of Redmond, Wash. The mail system 56 may be any server or other system supporting electronic communication services, such as an a post office protocol 3 (Pop3) mail server, simple network management protocol (SMTP) mail server, or Internet message access protocol (IMAP) mail server. The database system 58 may be any type of data store management system such as a DB2 database server available from International Business Machines Corporation of White Plains, N.Y.; a Microsoft query language (SQL) server available from Microsoft Corporation of Redmond, Wash.; a MySQL server available from open source; Oracle Database Server available from Oracle Corporation of Redwood Shores, Calif.; a Postgre database server available from open source, and Sybase database server available from Sybase Incorporated of Dublin, Calif. The web system 60 may be any server or other system hosting or supporting on-line services and/or World Wide Web pages including an Apache web server or Tomcat servlet container both available from Apache Software Foundation of Forest Hill, Md.; or a Microsoft Information Services (IIS) web server available from Microsoft Corporation of Redmond, Wash. The web server 60 may be hosted on any suitable computer system including the Microsoft Windows Server 2003™, Microsoft Internet Security and Acceleration Server 2004™, the BizTalk® server, the Commerce Server 2002™, the Content Management Server™, or the Host Integration Server 2000™, all available from Microsoft Corporation of Redmond, Wash. The file/print system 62 may be any file and/or print server or other system supporting file transfer, print services, and the like. An example file/print server may include an HP printer or JetDirect printer both available from Hewlett Packard Development Company of Palo Alto, Calif.; a Xerox Printer available from Xerox Corporation of Stamford, Conn.; a Lexmark file/print server available from Lexmark International Incorporated of Lexington, Ky.; or a file transfer protocol (FTP) server. The file/print server may be hosted on any suitable computer system such as a printer or server such as the Windows Server 2003™ platform. The communication and collaboration system 64 may have many similarities to a file server; however, its role is more directed towards enabling collaboration, responsiveness, and efficiencies across department, corporations, and continents. Example communication and collaboration systems may include the Office SharePoint Server™ available from Microsoft Corporation of Redmond, Wash. or a domain name system (DNS) server. It is to be appreciated that other alternative and/or additional roles may be defined and fulfilled by a system not shown in FIG. 1 including telnet services, SSH services, and the like. For example, an SSH server may have a unique role since it may be combination of a security and communication functions. Thus, the SSH server may be separate from the security systems.

The target systems 50-64 may be connected through a packet network such as a Local Area Network (LAN), a Wide Area Network (WAN) and/or the Internet. The systems of the target network may communicate with each other and external systems by sending and receiving packets under standard protocols such as the Transmission Control Protocol/Internet Protocol (TCP/IP), the User Datagram Protocol (UDP), the Internet Control Message Protocol (ICMP), and/or any other packet protocol. As determined by the protocols standards governing each system, each system must provide a predetermined response to predetermined data packets. Moreover, the software supporting each system, such as an operating system, may also determine how a system responds to a particular packet. Even further, the services supported by a target system may determine the response to a predetermined data packet. Analyzing the particular responses of a target system to various test probes may identify not only the operating system supported by the target system, but also the role fulfilled by the system.

To manage the computer network 10, a systems administrator may desire to know the role that each system fulfills within the network 10. To facilitate this process, the systems administrator may use a management system 100, shown in FIG. 1, to evoke responses from target systems in the network; and based on the responses, the management system 100 may determine the role of a target system of the network.

FIG. 1 schematically illustrates an exemplary management system 100 which may include a probe data store 12, a probe engine 14, a target data store 18, a signature data store 26, role data store 22, and a role resolver 20. The probe engine 14 may access the probe data store 12 to send test probes 30 to target systems of the network 10. The probe engine 14 may output probe test results 16 to the target data store 18. The role resolver 20 may compare the data from the target data store 18 with the signature data store 26 and determine at least one role of a target system within the network 10. The role and associated target system identifier may be stored in a role data store 24.

It is to be appreciated that although the probe data store, target data store, signature data store, role data store, probe engine, and role resolver are discussed herein as separate processes within the management system 100, any function or component of the management system 100 may be provided by any of the other processes or component. Moreover, it is to be appreciated that other management system configurations may be appropriate. For example, more than one probe engine may support the role resolver, more than one database may be available for storing test probe information and/or target responses, signature response comparisons may be hard coded into software supporting the role resolver, and/or any portion of the management system 100 may provided by any system which is part of the target network 10 or external to the target network.

As shown in FIG. 1, the probe engine 14 may be in communication with the target systems 50-64 of network 10 through a link 24 such as the Internet. Although the following scan of a target system is described with reference to scanning the target systems 50-64 of FIG. 1, it is to be appreciated that any one or combination of systems in the network 10 or another network may comprise the target systems scanned by the management system 100. To scan the target systems 50-64 and generate the desired responses 16, the probe engine 14 may access a probe data store 12 to receive test probes 30 to be sent to the target systems of the target network 10. Each test probe 30 may be one more data packets crafted to generate a desired response from the target system indicative of the software and/or services supported by the target system.

FIG. 2 illustrates an example method 200 of operation of the probe engine 14 of FIG. 1. The probe engine may identify 202 the target systems within the network 10 to be analyzed. Any identifier uniquely identifying each system to be targeted may be appropriate such as an Internet Protocol (IP) address, name, and the like. Although each target system may have more than one IP address, the targeted system may be identified by an IP address or alternatively, the target system may be only a portion of the IP addresses assigned to a particular system of the network. In this manner, the target system may be one or more IP addresses or other identifier assigned to a system in the target network 10.

Multiple target systems may be identified with a predetermined set of IP addresses or sub-addresses which may be continuous over a given range and/or may be discontinuous addresses and/or ranges. For example, target systems may be connected through a WAN or through the Internet, and as a result, the target systems may not have contiguous IP addresses. Accordingly, the IP addresses defining the target systems of the network 10 may run over multiple and discontinuous ranges of IP addresses. The IP addresses or other system identifiers may be known to the systems administrator, determined by an external system and communicated to the probe engine, and/or be a range of IP addresses most likely to cover the areas of interest to the systems administrator. The IP addresses may be passed to the probe engine 14 through a configuration data file or through any other suitable method.

To generate the desired responses from the target systems, the probe engine may send 204 test probes to each target system within the given range of IP addresses. The test probes 30 to be sent to each target system may be determined through any suitable process such as coded within a software executable or accessed from a probe data store 12, as shown in FIG. 1. Test probes 30 may be a single data packet or multiple data packets crafted to generate one or more desired responses 16 which provide information about the software and/or services supported by the target system. The test probes may be packets under any suitable protocol such as TCP/IP, UDP, SNMP, ICMP, and the like.

For example, the test probes 30 sent by the probe engine 14 may provide an initial scan of the target IP addresses to determine if a system is active at the given IP address. Although any system scan may be appropriate, the probe engine may ping each IP address in the range of addresses using a ICMP Echo request, a ICMP TimeStamp request, a ICMP Information Request, a ICMP Address Mask Request, and the like. In this manner, if a target system at an IP address responds to the ICMP Echo request, the system at that IP address may be considered active. Conversely, if the targeted system does not respond or sends a response with an error message, the probe engine may determine that a system at the IP address is not active. The ping to the target systems in the range of addresses may be applied using any suitable method such as the 'ping' utility under UNIX and the like.

For the active systems within the IP address range, the probe engine 14 of FIG. 1 may flag or otherwise indicate that the particular IP address is active. These activity indicators may be stored 206 in a target data store and associated with the IP address being probed. Additionally or alternatively, the probe engine 14 may store a probe identifier which indicates the particular probe being applied and/or may store the response string from the target system. In this manner, the target data store 18 may store an IP address associated with an activity indictor, a probe identifier, and/or the response from the target system. The target data store 18 may be any suitable data store in any suitable format.

Each IP address of a target system may have a number of ports that may be open and working, open and not responding, or closed. In one example, port numbers may be 16-bit unassigned numbers and may range from 0 to 65535. Port numbers are not typically controlled, but under standards of practice, some port numbering schemes have become standard for certain services. For example, standard ports (ports 0 to 1023), e.g., The Well Known Ports, may be assigned services by the Internet Assigned Numbers Authority (IANA). Some examples of assigned ports include port 7 as a TCP echo port, port 20 as a FTP file transfer (default data) port, port 21 as a FTP file transfer (control) port, port 22 as a TCP secure shell (SSH) remote login protocol port, port 23 as a TCP telnet port, port 53 as a UDP domain name server port, port 80 as a TCP World Wide Web HTTP port. Other ports may also provide standard services, such as port 1512 may be a TCP Microsoft Windows® Internet Name Service, port 1812 may be a UDP RADIUS™ authentication protocol port, port 5010 may be a Yahoo!® Messenger port, ports 6000-6063 may be TCP X Window System or UDP ports, ports 500, 1701, and 4500 may be a tunneling protocol over Internet Protocol Security (IPSec), ports 50000, 1433, 2433, 3306, 1521, 5432, 5000, 5001, 5002, 5003, 5004, and 4100 may be database server ports.

To use the information of services available on particular ports, the probe engine 14 of FIG. 1 may scan the ports of a target system to determine the software and/or services supported by the target system. For example, the probe engine may send carefully crafted test probes 30 to one or more ports at an IP address of a target system. The probe engine may send test probes to all ports, e.g., 0-65535, or only to selected ports which may reply to test probes with responses that are indicative of the role fulfilled by the target system. Under the rules and regulations of the governing protocol, usage standards, and software and services supported by the target system, the ports respond to the packets in predetermined and recognizable ways. For example, if the target system has a role as a web server, it most likely will have an active port 80 and will respond to a hyptertext transfer protocol (HTTP) request with web page banner response. Consequently, the responses 16 may be treated as a signature of a system, e.g., if a target systems responds in a particular way, then the target system supports a particular protocol, software and/or service.

The test probes for generating the signature responses from the target system may be any suitable data packet or set of data packets for generating a response from a target system including test probes suitable for operating system fingerprinting. For example, stack fingerprinting techniques may be used to identify the operating system and other services of the target system. In one example, requesting connection to the specified port may engender a response from the target system containing the operating system and/or service information such as manufacturer, software type and version. However, banner replies to a connection request may be modified or turned off by the target system administrator. Accordingly, a SYST test probe may be sent to the same port to provoke a response which may include additional system information to verify a response to a connection request. Any other fingerprinting methodology may be appropriate to evoke signature responses from a target system including a FIN packet (or any packet without an ACK or SYN flag), a packet with an undefined TCP 'flag' (e.g., bit 7 or 8) of a SYN packet, a PSH packet, a URG packet, a single packet purposefully drafted to generate a single error message, a number of packets purposefully crafted to generate multiple error message replies, a packet with overlapping fragments, a TCP query with one or more options set, and the like.

The probe engine may send test probes serially or in batches. Moreover, additional test probes may be sent as desired depending on the responses received from earlier test probes. For example, if the probe engine receives an ICMP response that a particular IP address of a target system is active, then the probe engine may send a port connection probe to determine which ports at that IP address are active. If a port is active or inactive, the probe engine may send appropriate test probes to engender further responses to either confirm services or generate error messages indicative of target system information. In another example, if the port engine receives a response that indicates that port 80 is active, the probe engine may send a request for a web page to verify the services provided by the target system as well as receive system information. In yet another example, the probe engine may send a portion of the test probes to active IP addresses and may send another portion of the test probes to inactive IP addresses. For example, the probe engine may send test probes to an inactive IP address to engender a signature error response from the inactive target system.

As noted above, the probe engine may store 206 the received responses from the target system in any suitable data store, such as target data store 18 shown in FIG. 1. In one example, the target data store may be a database which associates an IP address of a target system with a probe identifier, the response from the target system, and/or an activity indicator. In one example, the database may be multi-dimensional, e.g., each IP address may be associated with more than one test probe identifier and response.

Returning to FIG. 1, the responses 16 may then be communicated to or accessed by the role resolver 20. The role resolver 20 may determine identifying information such as the operating system supported by the target system and/or services supported by the target system, and from that system information determine at least one role of the target system. To determine the role of the target system in the network 10, the role resolver 20 may compare the one or more responses 16 with signature responses of a basis system which may be associated with a role in a signature data store 26.

An example method 300 of the role resolver 20 of FIG. 1 is illustrated in FIG. 3. The role resolver may access 302 a signature response associated with a role of a basis system and a test probe identifier. The role of the target system may be determined by comparing 304 the received response 30 with the signature response of a known system. The response may be matched to the appropriate signature response using any suitable technique including string matching such as hgrep and qgrep, and any other regular expressions or other pattern matching techniques.

Figure 4:
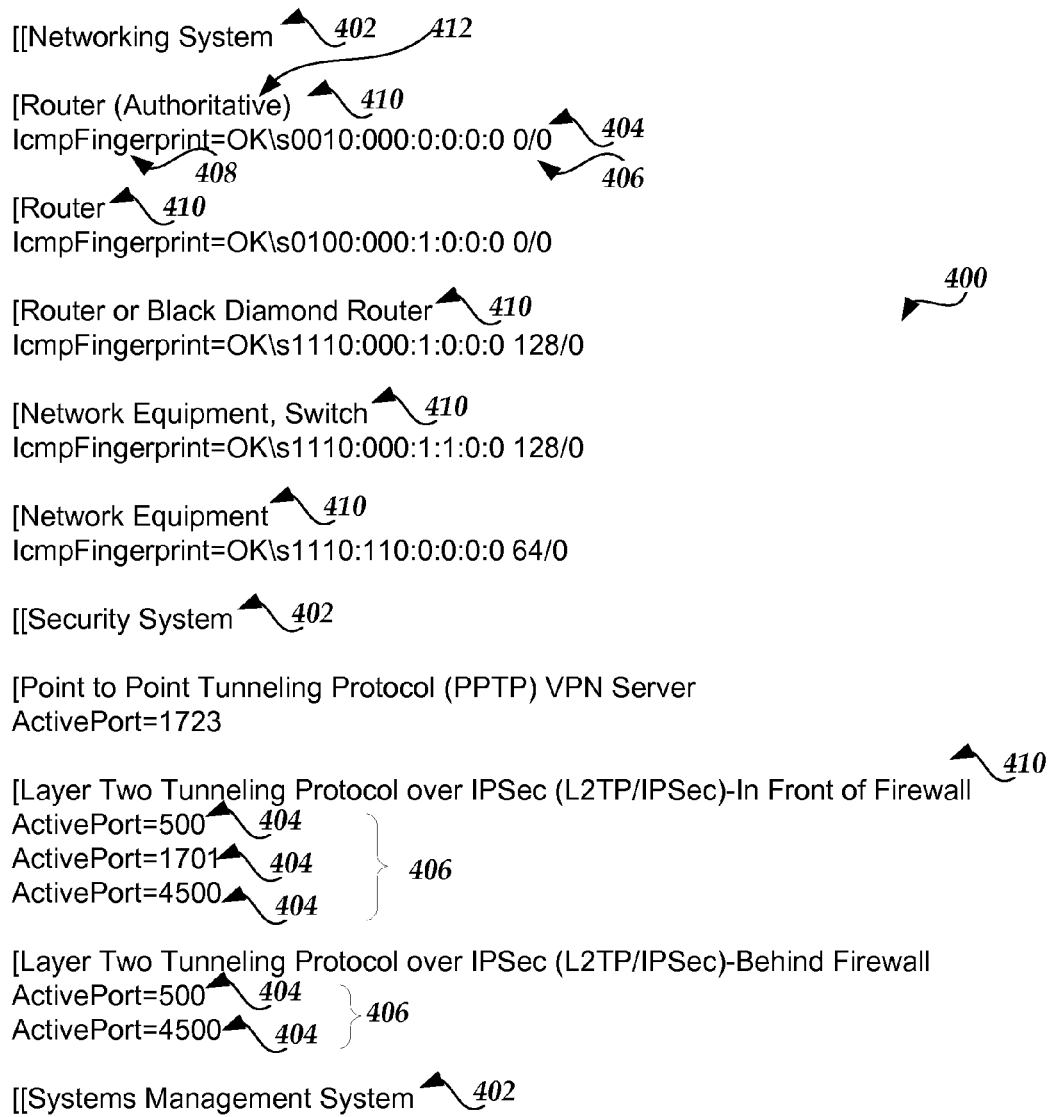

An example signature data store 26 is shown in FIGS. 4-7. It is to be appreciated that the signature data store may be any suitable data store in any format or protocol suitable to store a general role 402 associated with a target system identifier and optionally associated with a test probe identifier 408, an activity indicator, a test probe response 404, a specific role 410, an operating system indicator, a version of the operating system, and/or a provider of the operating system. The signature data store 26 of FIGS. 4-7 is a configuration file which associates a role 402 of a target system with signature responses 404. As shown in FIG. 4, the potential roles of a target system may include a networking system; a security system; a systems management system, a file/print system, an email system, a collaboration and communication system, a database system, a web server, an secure shell system, and a telnet system. Each role 402 may be associated with one or more sets 406 of test probe responses and test probe identifiers. If selected responses 16 from the target system match each of the responses of a particular test set 406, then the target system may be associated 306 with that the role as shown in FIG. 3.

It is to be appreciated that the signature data store 26 may have any format or protocol suitable to store the role of a system associated with the signature responses of a system having that role. In the example signature data store of FIGS. 4-7, a general role 402 may be indicated with a '[[' symbol, and each set of responses indicative of that role may be indicated with a '[' symbol, and may be further associated with a specific type, provider, and/or version of the general role. For example as shown in FIG. 4, the general role 402 may be a networking system. However, if the received responses 16 from the target system indicate that the ICMP fingerprint includes "O" and "0000:000:0:0:0:0 0/0", then a specific role 410 such as a 'router' may be additionally or alternatively associated with the target system. Each signature response 404 indicative of a role may be associated with the test probe generating that response with and'=' symbol'. The signature response may include any symbol or indicator of a 'wild card' or other string matching parameter. For example in the signature data store of FIGS. 4-7, the symbol '\*' may match with 0 or more characters in a response, the symbol '\?' may match with any exactly one character of a response, the symbol '\s' may match with a space, tab, ':' or '=' symbol in a response, the symbol '\ \' may match with a single '\' symbol in a response, and the symbol '\d' may match with a number comprising one or more characters in a response.

The test probe indicator may be any suitable indicator such as a string number, symbol and the like associated with a test probe. In the example signature data store of FIG. 4-7, 'IcmpFingerprint' indicates probes described in Arkin et al., "ICMP Usage in Scanning—The Complete Know How," http://www.sys-security.com/html/projects/icmp.html, Version 3, June 2001, pp. 1-218 and Arkin et al., "ICMP Based Remote OS TCP/IP Stack Fingerprinting Techniques," Phrack, Inc., Vol. 0x0b, Issue 0x39, http://www.phrack.org/phrack/57/p57-0x07, 'Db2Check indicates a probe for a DB2 port being open, 'DnsInfo indicates a DNS lookup, 'FtpVersion' is a banner grab, 'Httpversion' is a check for a port being open, a banner grab for the web site, and other probes detecting services, 'Mysqlcheck' indicates a probe detecting a MySQL database, 'NbInfo' indicates Win32 Application interface calls, 'Oraclecheck' indicates a test for a standard Oracle port being open and existence of an Oracle database, 'PopVersion' indicates a banner grab from a Pop mail server, 'PostgreCheck' indicates probes for a PostgreSQL database server, 'SmtpVersion' indicates a banner grab, 'SqlCheck' indicates probes for SQL, SshVersion indicate a banner grab, 'SybaseEaCheck' indicates a test for a Sybase EA database server and port being open, and 'TelenetVersion' fingerprints a telnet server.

As shown in FIGS. 4-7, the test sets 406 may be arranged from most likely to least likely expected results of a test probe response. Accordingly, the role resolver may compare the responses from the target system with the first test set and determine if there is a match. If not, then the role resolver may compare the target system responses to the next test set, and so on. Alternatively, as discussed above, the role resolver may compare the target system responses with all or a portion of the test sets 406 of the signature data store to determine multiple roles of the target system.

For example, a target system may be associated with IP address 192.168.5.23 and may provide responses to a variety of test probes. Specifically, the target system 60 of FIG. 1 may provide responses 16 which may have a NbInfo value including OK and the strings "Windows XP" and "v5.1"; an HttpVersion including the string "Microsoft-IIS"; an IcmpFingerprint including OK 1100:100:0:0:0:0 128/0. To resolve these responses into a role, the role resolver may compare the results with the signature responses of FIGS. 4-7 to determine the role of the target system. In the given example, the IcmpFingerprint of the target system does not match any of the signature IcmpFingerprints in the networking system role. Thus, the role resolver may determine that the target system is most likely not a networking system. The target system does not have an active port 1723, and thus the target system is not determined to have the role of a security system with point to point tunneling protocol as a VPN server. Similarly, the target system does not have active ports of 500, 1701 and 4500, and thus is not a layer two tunneling protocol over IPSec security system, either in front of or behind the firewall. Since the target system does not have an active port number 77777, then it may not be a systems management system. The role resolver may compare the target system responses 16 with the signature responses until it finds a match. For example, since the target system HttpVersion includes the string "Microsoft-IIS", then the role resolver may determine that a general role 402 of the target system is a web server, and a specific role 410 is a Microsoft IIS Web Server. As shown in FIG. 3 the role resolver may associate 308 the determined roles with the target system identifier, such as the IP address. For example, the role resolver may store the determined roles in a role data store 22, shown in FIG. 1.

In some cases, it may be possible that a target system may fulfill more than one role in the network. Accordingly, the role resolver 20 of FIG. 1 may determine one or more roles for each target system as indicated by the signature responses compared to the received responses. Additionally, although the target system may have only a single role, the role resolver may return multiple roles which are possible matches for the target system, particularly, if the test probes are not determinative of a particular system. In this case, multiple roles may be returned to indicate possibilities for further research, analysis, or testing by the role resolver or the systems administrator. To assist the administrator in further analysis of the role determination, the role resolver may return the actual response returned by the target system. In this manner, the systems administrator may use the returned response with his knowledge of the target system and heuristics to further determine the role of the target system. Additionally, multiple roles may be returned with associated confidence levels to indicate the confidence of the role determination.

Since the results of a test probe may not be wholly determinative of a role, the role resolver may determine potential or likely roles of the computer system. To communicate the confidence of the role determination, the role resolver may associate a confidence level indicator with the determined role of the target system. As shown in FIGS. 4-7, the confidence level indicator 412 may have a value of 'authoritative', 'possible', and 'default'. However, it is to be appreciated that any suitable confidence level indicator may be appropriate such as numerical weights, high/medium/low confidence' levels, or any other confidence indicator. If a confidence level is determined, the role resolver may associate 310 the confidence level with the determined role of the target system, as shown in FIG. 3.

As shown in FIG. 3, the signature data store 26 may also associate 308 a manufacturer or provider of the indicative role. For example, as shown in FIGS. 4-7, potential manufacturers may include the Microsoft Corporation, Sun Microsystems, Hewlett Packard, Xerox, and the like. The provider of the services or software fulfilling the role may be associated with the appropriate test set 406 in any suitable manner. For example, in FIGS. 4-7, the provider of a role, if determinable, is indicated in the specific role 410 of a test probe set 406.

Each system within the network may be supported by one or more operating systems. Example operating systems may include Windows® 95, Windows® 98, Windows® ME, Windows NT®, Windows® 2000 Professional, Windows® 2000 Server, all available from Microsoft Corporation of Redmond, Wash.; Cisco® router operating system available from Cisco Systems, Inc. of San Jose, Calif.; Mandrakelinux™ available from Mandrakesoft S.A. of Paris, France; Debiang Linux available from Software in the Public Interest and through open source; Red Hat® Linux available from Red Hat, Inc. of Durham, N.C.; Linux available from various open sources; Solaris® available from Sun Microsystems, Inc. of Santa Clara, Calif.; HP-UX® available from Hewlett Packard Company of Palo Alto, Calif.; Novell®) available from Novell, Inc. of Orem, Utah; Mac OS® available from Apple Computer, Inc. of Cupertino, Calif.; UNIX® available from The Open Group of San Francisco, Calif.; HP JetDirect® and HP printers operating systems available from Hewlett Packard Development Company of Palo Alto, Calif.; Xerox® printer operating system available from Xerox Corporation of Stamford, Conn.; and AIX™ available from open sources; and any other operating system.

Returning to FIG. 3, using operating system fingerprinting techniques, the role resolver may also determine 312 the operating system of the target system based on a comparison of the responses from the target system with signature responses. One having skill in the art may recognize that several test probes are suitable to fingerprint the operating system of a target system. The test probes for fingerprinting the operating system may be identical and/or additional to at least a portion of the test probes for determining the role of the target system. The test probes for fingerprinting the target system may be stored in the probe data store or may be stored in any other suitable data store. The operating system may be determined by the role resolver in a manner similar to the determination of the role of the target system. Specifically, the role resolver may compare the responses to the test probes with signature responses in the signature data store or any other appropriate data store to determine a matching or potential operating system of the target system. The provider and/or version of the operating system may also be determined. The operating system, provider, and/or version may be stored in the role data store or in any other suitable data store to communicate the results to the systems administrator.

As shown in FIGS. 1 and 3, the determined role or multiple roles of the target system may be stored 314 in a role store 22. The role store may associate a target system identifier, such as an IP address, with the determined role or roles of the target system. All results of a network may be stored in a single data store with each role associated with a target system identifier. Alternatively, a separate role data store may be created for each target system probed by the probe engine or for each target system defined as having a determinable role. The associated role store may include the general role 402 and/or the specific role 410 shown in FIGS. 4-7. As noted above, the role store may also associate a confidence level with selected roles, a provider of the service, an operating system, a version number of supported software, a test probe identifier, and/or the response from the target system. The role data store may be any suitable data store in any appropriate format. For example, the role data store may be the target data store initiated by the probe engine and modified by the role resolver, or may be a separate data store to ensure the integrity of the responses received from the target systems for analysis. The role data store may be sent 316 to a display device or client system for access by the system administrator or other system management system.

Figure 8:
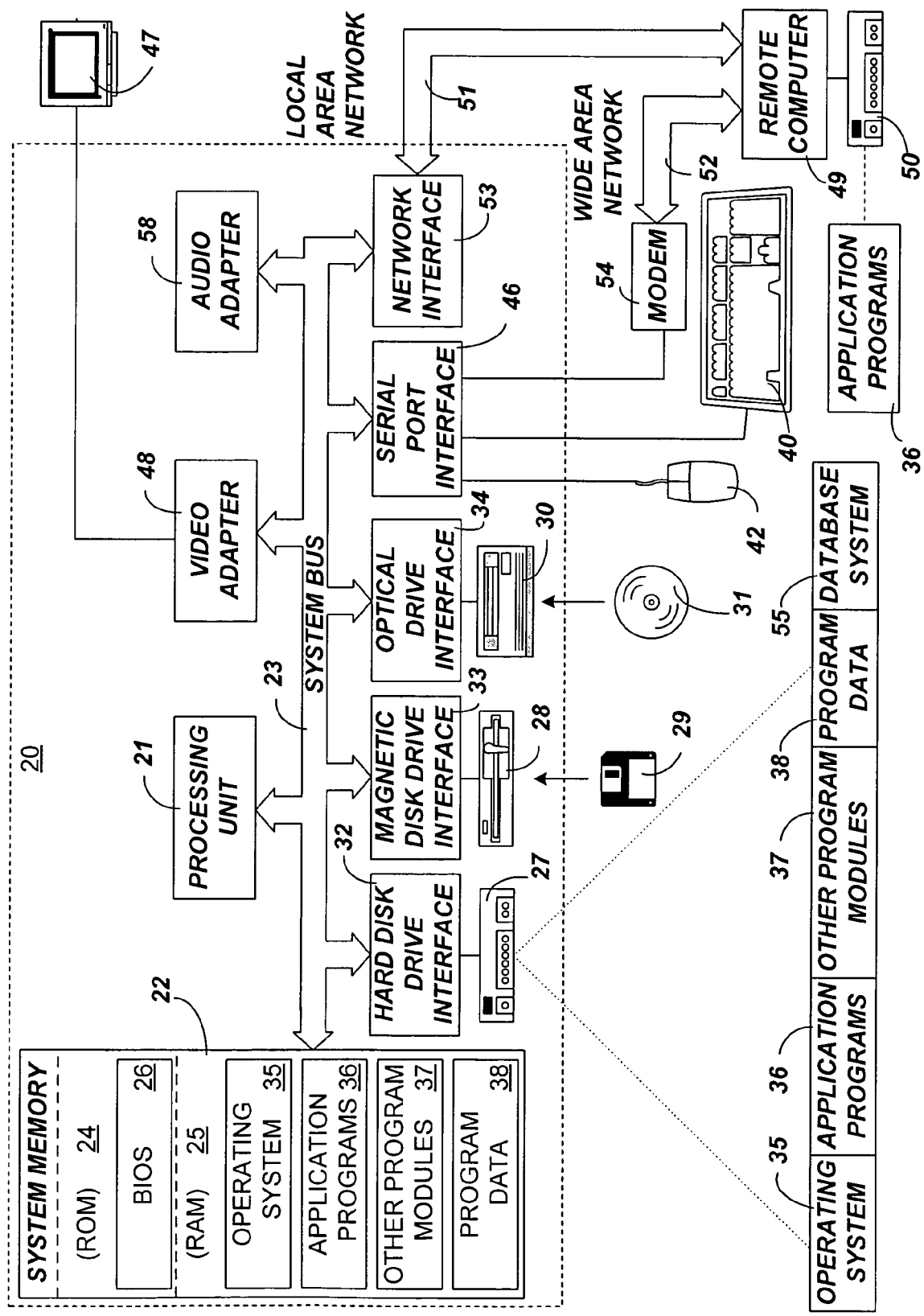
FIG. 8 is an example schematic of a computer system in one embodiment.

FIG. 8 illustrates an example of a suitable computing system environment 900 on which any combination of the probe data store, probe engine, target data store, role resolver, signature data store, and role data store of the management system 100 may be implemented. The computing system environment 900 is only one example of a suitable computing environment and is not intended to suggest any limitation as to the scope of use or functionality of the management system 100. Neither should the computing environment 900 be interpreted as having any dependency or requirement relating to any one or combination of components illustrated in the exemplary operating environment 900.

The management system 100 is operational with numerous other general purpose or special purpose computing system environments or configurations. Examples of well known computing systems, environments, and/or configurations that may be suitable for use with the management system 100 include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The management system 100 may be described in the general context of computer-executable instructions, such as program modules, being executed by a computer. Generally, program modules include routines, programs, objects, components, data structures, etc. that perform particular tasks or implement particular abstract data types. The management system 100 may also be practiced in distributed computing environments where tasks are performed by remote processing devices that are linked through a communications network. In a distributed computing environment, program modules may be located in both local and remote computer storage media including memory storage devices.

With reference to FIG. 8, an exemplary system for implementing the management system 100 includes a general purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 910. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 8 illustrates operating system 934, application programs 935, other program modules 936, and program data 937.

The computer 910 may also include other removable/non-removable, volatile/nonvolatile computer storage media. By way of example only, FIG. 8 illustrates a hard disk drive 940 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 8, provide storage of computer readable instructions, data structures, program modules and other data for the computer 910. In FIG. 8, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the computer 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through a output peripheral interface 990.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 8. The logical connections depicted in FIG. 8 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 8 illustrates remote application programs 985 as residing on memory device 981. It will be appreciated that the network connections shown are exemplary and other means of establishing a communications link between the computers may be used.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method operations or system elements, it should be understood that those operations and those elements may be combined in other ways to accomplish the same objectives. Operations, elements, and features discussed only in connection with one embodiment are not intended to be excluded from a similar role in other embodiments. Moreover, use of ordinal terms such as "first" and "second" in the claims to modify a claim element does not by itself connote any priority, precedence, or order of one claim element over another or the temporal order in which operations of a method are performed, but are used merely as labels to distinguish one claim element having a certain name from another element having a same name (but for use of the ordinal term) to distinguish the claim elements.

The embodiments of the invention in which an exclusive property or privilege is claimed are defined as follows:

1. A computer readable memory device having computer executable instructions that when executed by a processor of a computing system perform a method comprising:
   accessing a target response of a target system, the target response comprising at least a portion of a reply to a test probe;
   determining a service supported by the target system by comparing the target response with a signature response;
   comparing the service supported by the target system with one or more roles associated with the service supported to determine at least one role of the target system; and
   determining a confidence level of the target system functioning in the at least one role of the target system;
   wherein the confidence level is a function of a number of roles to which the target response corresponds; and
   wherein the confidence level is indicated with a confidence level indicator comprising a numerical weight value.

2. The computer readable memory device of claim 1, comprising sending the test probe to an Internet Protocol address of the target system and receiving the target response in response to the test probe.

3. The computer readable memory device of claim 1, wherein the test probe comprises an Internet control message protocol packet.

4. The computer readable memory device of claim 1, comprising sending the test probe to a port of the target system, receiving the target response in response to the test probe, and storing the target response in a target data store.

5. The computer readable memory device of claim 4, wherein the test probe comprises a transmission control protocol/Internet protocol connection request.

6. The computer readable memory device of claim 5, wherein the test probe comprises a web page request.

7. The computer readable memory device of claim 1, comprising sending the test probe to a network name of the target system and receiving the target response in response to the test probe.

8. The computer readable memory device of claim 1, comprising determining a provider of the service supported.

9. The computer readable memory device of claim 1, comprising determining an operating system of the target system based on the comparison of the target response and the signature response.

10. The computer readable memory device of claim 1, wherein the at least one role is from a group consisting of networking, collaboration and communication, security, systems management, file/print, mail, database, and web.

11. The computer readable memory device of claim 1, wherein the confidence level indicator comprises a value of high, medium, or low.

12. A computer readable memory device having computer executable instructions that when executed cause a computer to store:
   a first data field comprising data representing a target response of a target system, the target response comprising at least a portion of a reply to a test probe;
   a second data field associated with the first data field comprising data representing a service supported by the target system as determined by comparing the target response with a signature response;
   a third data field associated with the second data field comprising data representing at least one role of the target system as determined by comparing the service supported by the target system with one or more roles associated with the service supported; and
   a fourth data field associated with the third data field comprising data representing a confidence level of the target system functioning in the at least one role of the target system;
   wherein the confidence level is a function of a number of roles to which the target response corresponds; and
   wherein the confidence level is indicated with a confidence level indicator comprising a numerical weight value.

13. A computer readable memory device having computer executable components comprising:
   a role resolver for determining at least one role of a target system by determining a service supported by the target system based on a comparison of a response of the target system to a test probe with a signature response and comparing the service supported by the target system with one or more roles associated with the service supported to determine at least one role of the target system; and
   a confidence determiner for determining a confidence level of the target system functioning in the at least one role of the target system;
   wherein the confidence level is a function of a number of roles to which the target response corresponds; and
   wherein the confidence level is indicated with a confidence level indicator comprising a numerical weight value.

14. The computer readable storage memory device of claim 13, comprising a test probe data store component configured to store the test probe associated with at least one test packet.

15. The computer readable memory device of claim 14, wherein the at least one test packet is an Internet control message protocol packet.

16. The computer readable memory device of claim 14, wherein the at least one test packet is a transmission control protocol/Internet protocol packet.

17. The computer readable memory device of claim 13, wherein the at least one role is from a group consisting of networking, collaboration and communication, security, systems management, file/print, mail, database, and web.

18. The computer readable memory device of claim 13, wherein the role resolver determines at least one of an operating system of the target system, a version of the operating system of the target system, a provider of the operating system, a provider of the service supported, and an activity indicator of the target system.

19. A system for managing systems comprising:
a memory in which machine instructions are stored; and
a processor that is coupled to the memory, the processor executing the machine instructions to perform acts comprising:
accessing a target response of a target system, the target response comprising at least a portion of a reply to a test probe;
determining a service supported by the target system by comparing the target response with a signature response;
comparing the service supported by the target system with one or more roles associated with the service supported to determine at least one role of the target system; and
determining a confidence level of the target system functioning in the at least one role of the target system;
wherein the confidence level is a function of a number of roles to which the target response corresponds; and
wherein the confidence level is indicated with a confidence level indicator comprising a numerical weight value;
comparing the service supported by the target system with one or more roles associated with the services supported to determine at least one role of the target system.

20. The system of claim 19, wherein the at least one role is from a group consisting of a networking, collaboration and communication, security, systems management, file/print, mail, database, and web.

* * * * *